(12) United States Patent
Stapp (10) Patent No.: US 9,657,599 B2
(45) Date of Patent: May 23, 2017

(54) POWER GENERATION SYSTEM AND METHOD WITH PARTIALLY RECUPERATED FLOW PATH

(71) Applicant: Peregrine Turbine Technologies, LLC, Wiscasset, ME (US)

(72) Inventor: David Scott Stapp, Bremen, ME (US)

(73) Assignee: Peregrine Turbine Technologies, LLC, Wiscasset, ME (US)

( * ) Notice: Subject to any disclaimer, the term of this patent is extended or adjusted under 35 U.S.C. 154(b) by 251 days.

(21) Appl. No.: 14/632,672

(22) Filed: Feb. 26, 2015

(65) Prior Publication Data
US 2015/0240665 A1   Aug. 27, 2015

Related U.S. Application Data

(60) Provisional application No. 61/966,574, filed on Feb. 26, 2014.

(51) Int. Cl.
| F01K 23/02 | (2006.01) |
| F02C 6/04 | (2006.01) |
| F01K 3/18 | (2006.01) |
| F01K 11/02 | (2006.01) |
| F01K 25/10 | (2006.01) |
| F02C 1/04 | (2006.01) |
| F02C 1/10 | (2006.01) |
| F02C 1/00 | (2006.01) |

(52) U.S. Cl.
CPC ............... *F01K 3/18* (2013.01); *F01K 11/02* (2013.01); *F01K 23/02* (2013.01); *F01K 25/103* (2013.01); *F02C 1/007* (2013.01); *F02C 1/04* (2013.01); *F02C 1/10* (2013.01); *F02C 6/04* (2013.01)

(58) Field of Classification Search
CPC .......... F01K 3/18; F01K 25/103; F01K 23/02; F01K 11/02; F02C 6/04; F02C 1/007; F02C 1/04; F02C 1/10
USPC ........ 60/772, 39.181, 39.183, 650, 655, 651
See application file for complete search history.

(56) References Cited

U.S. PATENT DOCUMENTS

| 3,058,018 | A | | 10/1962 | Deming |
| 3,971,211 | A | * | 7/1976 | Wethe ..................... F01K 7/32 |
| | | | | 60/39.181 |
| 4,138,618 | A | | 2/1979 | Jaeschke |
| 4,166,362 | A | | 9/1979 | Laurent |
| 4,267,692 | A | | 5/1981 | Earnest |
| 4,347,711 | A | | 9/1982 | Noe |
| 4,375,745 | A | | 3/1983 | Schelp |
| 4,498,289 | A | | 2/1985 | Osgerby |
| 4,520,284 | A | | 5/1985 | Wolcott |
| 4,683,392 | A | | 7/1987 | MacDonald |

(Continued)

FOREIGN PATENT DOCUMENTS

WO    WO 95/24822    9/1995

OTHER PUBLICATIONS

Dostal, "Supercritical Carbon Dioxide Cycle for Next Generation Nuclear Reactor", Advanced Nuclear Power Technology Program, Mar. 2004, 326 pgs.

(Continued)

*Primary Examiner* — Hoang Nguyen
(74) *Attorney, Agent, or Firm* — Baker & Hostetler LLP (57) ABSTRACT

The present disclosure relates to a power generation system and related methods that use supercritical fluids, whereby a portion of the supercritical fluid is recuperated.

43 Claims, 6 Drawing Sheets

(56) References Cited

U.S. PATENT DOCUMENTS

| | | |
|---|---|---|
| 4,780,637 A | 10/1988 | Wolcott |
| 5,323,603 A | 6/1994 | Malohn |
| 6,191,561 B1 | 2/2001 | Bartel |
| 6,318,066 B1 | 11/2001 | Skronski |
| 6,430,916 B2 | 8/2002 | Sugishita |
| 6,606,864 B2 | 8/2003 | MacKay |
| 6,848,249 B2 | 2/2005 | Coleman |
| 6,945,052 B2 | 9/2005 | Frutschi |
| 6,991,026 B2 | 1/2006 | Costen |
| 7,037,430 B2 | 5/2006 | Donaldson |
| 7,669,423 B2 | 3/2010 | Nakhamkin |
| 7,685,820 B2 | 3/2010 | Litwin et al. |
| 7,726,114 B2 | 6/2010 | Evulat |
| 7,880,355 B2 | 2/2011 | Qu |
| 7,966,868 B1 | 6/2011 | Sonnichsen |
| 8,820,083 B2 * | 9/2014 | Davidson .............. H02J 4/00 60/671 |
| 2001/0023580 A1 | 9/2001 | Sugishita |
| 2003/0180259 A1 * | 9/2003 | Brem .............. A61K 38/1866 424/93.2 |
| 2007/0125063 A1 | 6/2007 | Evulat |
| 2010/0101231 A1 | 4/2010 | Westmeier |
| 2010/0242429 A1 | 9/2010 | Smith |
| 2011/0154822 A1 * | 6/2011 | Protz .............. F01K 19/08 60/651 |
| 2011/0179799 A1 | 7/2011 | Allam |
| 2011/0206173 A1 | 8/2011 | Walters |
| 2012/0067055 A1 * | 3/2012 | Held .............. F02C 7/12 60/772 |
| 2012/0216536 A1 | 8/2012 | Ma et al. |
| 2013/0180259 A1 | 7/2013 | Stapp |

OTHER PUBLICATIONS

Wright, "Operation and Analysis of a Supercritical $CO_2$ Brayton Cycle", Sandia National Laboratories, SAND2010.0171, Sep. 2010, 101 pgs.

* cited by examiner

POWER GENERATION SYSTEM AND METHOD WITH PARTIALLY RECUPERATED FLOW PATH

CROSS-REFERENCE TO RELATED APPLICATION

The present application claims priority to and the benefit of U.S. Provisional Application No. 61/966,574, filed Feb. 26, 2014, the entire contents of which are incorporated by reference into this application in their entirety.

TECHNICAL FIELD

The present disclosure relates to a power generation system and related methods that use supercritical fluids, and in particular, to a power generation system and related methods where a portion of the supercritical fluid is recuperated.

BACKGROUND

Traditionally, thermodynamic power generation cycles, such as the Brayton cycle, employ an ideal gas, such as atmospheric air. Such cycles are typically open in the sense that after the air flows through the components of the cycle, it is exhausted back to atmosphere at a relatively high temperature so that a considerable amount heat generated by the combustion of fuel is lost from the cycle. A common approach to capturing and utilizing waste heat in a Brayton cycle is to use a recuperator to extract heat from the turbine exhaust gas and transfer it, via a heat exchanger, to the air discharging from the compressor. Since such heat transfer raises the temperature of the air entering the combustor, less fuel is required to achieve the desired turbine inlet temperature. The result is improved thermal efficiencies for the overall thermodynamic cycle. However, even in such recuperated cycles, the thermal efficiency is limited by the fact that the turbine exhaust gas temperature can never be cooled below that of the compressor discharge air, since heat can only flow from a high temperature source to a low temperature sink. More recently, interest has arisen concerning the use of supercritical fluids, such as supercritical carbon dioxide (SCO2), in closed thermodynamic power generation cycles. One such prior art system 1 is illustrated in FIG. 1.

Figure 1:
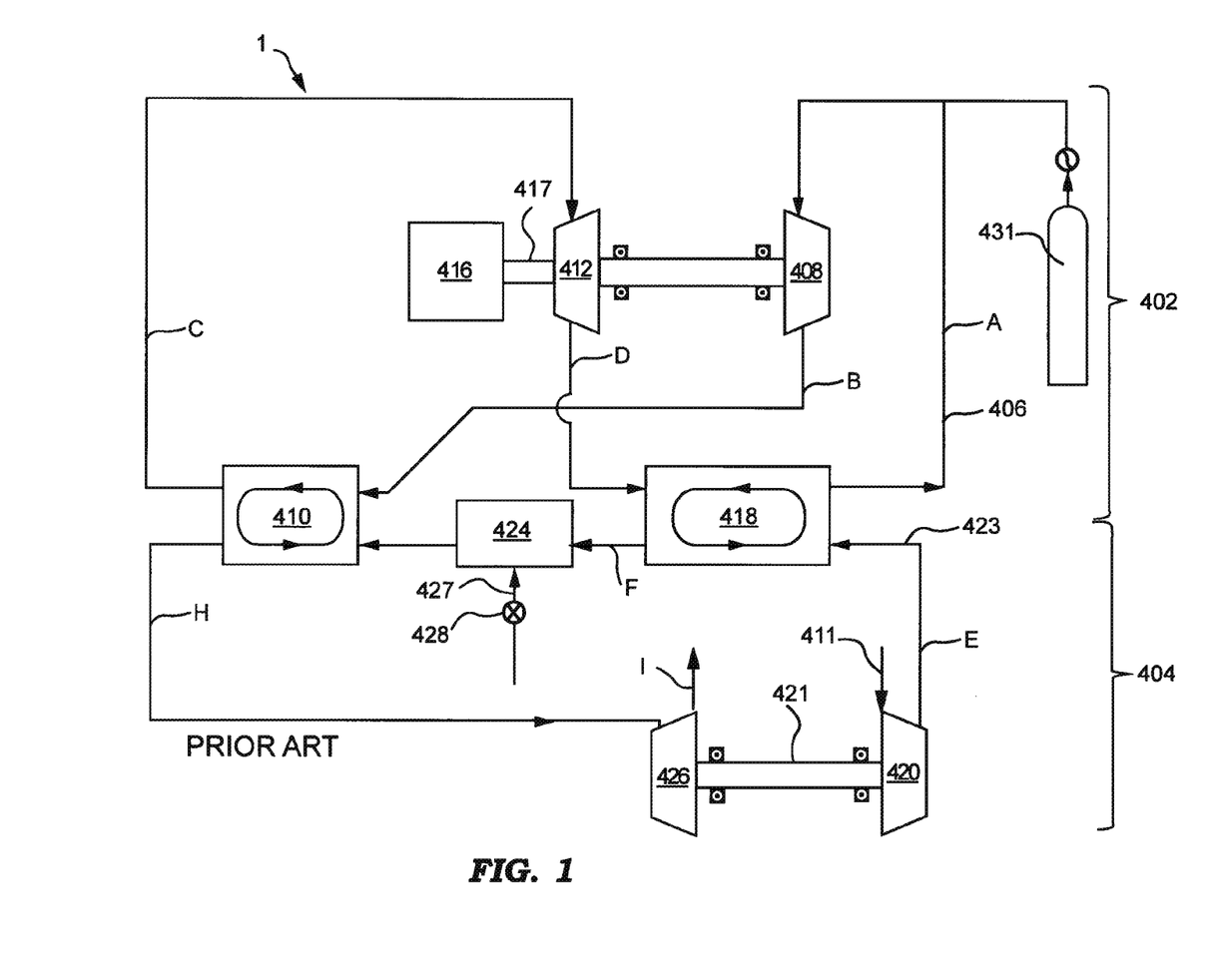
FIG. 1 is a schematic diagram of a prior art power generation system incorporating a supercritical fluid.

As shown in FIG. 1, the prior art power generation system 1 includes compressors, turbines, combustors and heat exchangers arranged in a first Brayton cycle 402, in which the working fluid is a supercritical fluid, and a second Brayton cycle 404, in which the working fluid is ambient air. The system 1 therefore includes an SCO2 cycle flow path 406 and air breathing cycle flow path 423, which may be separate from each other.

In FIG. 1, the flow of SCO2 along flow path 406 is as follows. Initially, a stream A of supercritical fluid is supplied to the inlet of a compressor 408. The supercritical fluid enters the inlet of the compressor 408 after it has been cooled and expanded to a temperature and pressure that is close to its critical point. The supercritical fluid is supplemented by a supercritical fluid source 431. After compression in the compressor 408, the stream B of SCO2 is heated in a cross cycle heat exchanger 410, which is connected to the SCO2 flow path 406 and air breathing flow path 423. The stream C of heated SCO2 from the heat exchanger 410 is then directed to the inlet of a turbine 412, where the SCO2 is expanded and produces shaft power that drives both the SCO2 compressor 408 and an output device 416 by shaft 417. The output device 416 can be a turboprop, turbofan, gearbox or generator. After expansion in the turbine 412, the stream D of SCO2 is cooled in a second cross cycle heat exchanger 418, also connected to the SCO2 flow path 406 and air breathing flow path 423. The stream A of cooled SCO2 is returned to the inlet of the compressor 408 via the flow path 406. In the air breathing Brayton cycle 404, initially, ambient air 411 is supplied to a compressor 420. The stream E of compressed air from the compressor 420 is then heated in the heat exchanger 418 by the transfer of heat from the SCO2 after the SCO2 has been expanded in the turbine 412. The stream F of heated compressed air is then directed to a combustor 424. The combustor 424 receives a stream 427 of fuel, such as jet fuel, diesel fuel, natural gas, or bio-fuel, is introduced by a fuel controller 428 and combusted in the air so as to produce hot combustion gas. The stream G of the combustion gas from the combustor 424 is directed to the heat exchanger 410 where heat is transferred to the SCO2, as discussed above. After exiting the heat exchanger 410, the stream H of combustion gas is expanded in a turbine 426, which produces power to drive the air compressor 420, via shaft 421. After expansion in the turbine 426, the combustion gas I is exhausted to atmosphere.

While the supercritical-ambient fluid cycle power generation system 1 shown in FIG. 1 can be advantageous, the heat exchangers required to transfer heat between the supercritical fluid cycle and the ambient cycle may be large, expensive, and impractical to implement. More effectively managing flow cycles can improve heat transfer efficiency in power generation systems that employ supercritical fluid cycles.

SUMMARY

An aspect of the present disclosure is a method for generating power in a system that includes a supercritical fluid cycle having a supercritical fluid flowing therethrough, an air-breathing cycle having air flowing therethrough that does not mix with the flow of the supercritical fluid. The method includes the step of directing air along the air-breathing cycle to flow through a plurality of heat exchangers. The method includes compressing the supercritical fluid in a supercritical fluid compressor along the supercritical fluid cycle and splitting the supercritical fluid discharged from the supercritical fluid compressor into first and second discharge streams of compressed supercritical fluid, such that the first discharge stream of compressed supercritical fluid flows through a recuperating heat exchanger. The method includes mixing the supercritical fluid discharged from the recuperating heat exchanger with the second discharge stream of compressed supercritical fluid and directing a mixture of compressed supercritical fluid through one of the plurality of heat exchangers arranged and into an inlet of a supercritical fluid turbine, such that heat from the air along the air-breathing cycle is transferred to the mixture of compressed supercritical fluid. The method includes splitting the supercritical fluid discharged from the supercritical fluid turbine into a first and second discharge streams of expanded supercritical fluid such that the first discharge stream of expanded supercritical fluid flows through the recuperating heat exchanger so as to heat the first discharge stream of compressed supercritical fluid. In addition, the method includes mixing the expanded supercritical fluid discharged from the recuperating heat exchanger with the second discharge stream of expanded supercritical fluid. The mixture of expanded supercritical fluid is directed toward the inlet of the supercritical compressor, wherein heat from the mixture of expanded supercritical fluid is transferred to the air of the air-breathing cycle, thereby cooling the mixture of expanded supercritical fluid to approximately its critical point.

Another aspect of the present disclosure is a system configured to generate power. The system includes a supercritical fluid cycle. The supercritical fluid cycle includes a supercritical fluid compressor configured to receive and compress a supercritical fluid, a supercritical fluid turbine configured to receive and expand the supercritical fluid, and a recuperating heat exchanger configured to receive discharge streams from the supercritical fluid compressor and the supercritical fluid turbine. The system also includes an air breathing cycle configured to heat air flowing along the air breathing cycle. The system further includes a plurality of heat exchangers arranged so that supercritical fluid from the supercritical fluid cycle and air from the air breathing cycle passes therethrough but does not intermix. The system is configured to: 1) split the supercritical fluid discharged from the supercritical fluid compressor into first and second discharge streams of compressed supercritical fluid, such that a) the first discharge stream of compressed supercritical fluid flows through the recuperating heat exchanger, and b) the second discharge stream of compressed supercritical fluid flows through one set of the plurality of heat exchangers; and 2) split the supercritical fluid discharged from the supercritical fluid turbine into a first and second discharge streams of expanded supercritical fluid such that a) the first discharge stream of expanded supercritical fluid flows through the recuperating heat exchanger, and b) the second discharge stream of expanded supercritical fluid flows through a different set of the plurality of heat exchangers. Heat from the first discharge stream of expanded supercritical fluid is transferred to the first discharge stream of the compressed supercritical fluid in the recuperating heat exchanger.

Another aspect of the present disclosure is a system configured to generate power. The system includes a supercritical fluid cycle. The supercritical fluid cycle includes a supercritical fluid compressor configured to receive and compress a supercritical fluid, a supercritical fluid turbine configured to receive and expand the supercritical fluid, and a recuperating heat exchanger configured to receive discharge streams from the supercritical fluid compressor and the supercritical fluid turbine. The system also includes an air breathing cycle configured to heat air flowing along the air breathing cycle. The system also includes a plurality of heat exchangers arranged so that supercritical fluid from the supercritical fluid cycle and air from the an air breathing cycle passes therethrough but does not intermix, wherein a first heat exchanger of the plurality of heat exchangers is arranged to feed into an inlet of the supercritical fluid turbine, and a second heat exchanger of the plurality of heat exchangers is arranged to feed into an inlet of the supercritical fluid compressor. The first heat exchanger has a first heat capacity rate and the second heat exchanger has a second heat capacity rate that is substantially different than the first heat capacity rate. Further, the system is configured to: 1) split the supercritical fluid discharged from the supercritical fluid compressor into first and second discharge streams of compressed supercritical fluid, such that a) the first discharge stream of compressed supercritical fluid flows through the recuperating heat exchanger, and b) the second discharge stream of compressed supercritical fluid flows through the first heat exchanger of the plurality of heat exchangers; and 2) split the supercritical fluid discharged from the supercritical fluid turbine into a first and second discharge streams of expanded supercritical fluid such that a) the first discharge stream of expanded supercritical fluid flows through the recuperating heat exchanger, and b) the second discharge stream of expanded supercritical fluid flows through the second heat exchanger of the plurality of heat exchangers.

BRIEF DESCRIPTION OF THE DRAWINGS

The foregoing summary, as well as the following detailed description of an aspect, are better understood when read in conjunction with the appended diagrammatic drawings. For the purpose of illustrating the invention, the drawings show an aspect that is presently preferred. The invention is not limited, however, to the specific instrumentalities disclosed in the drawings. In the drawings.

DETAILED DESCRIPTION

Figure 2:
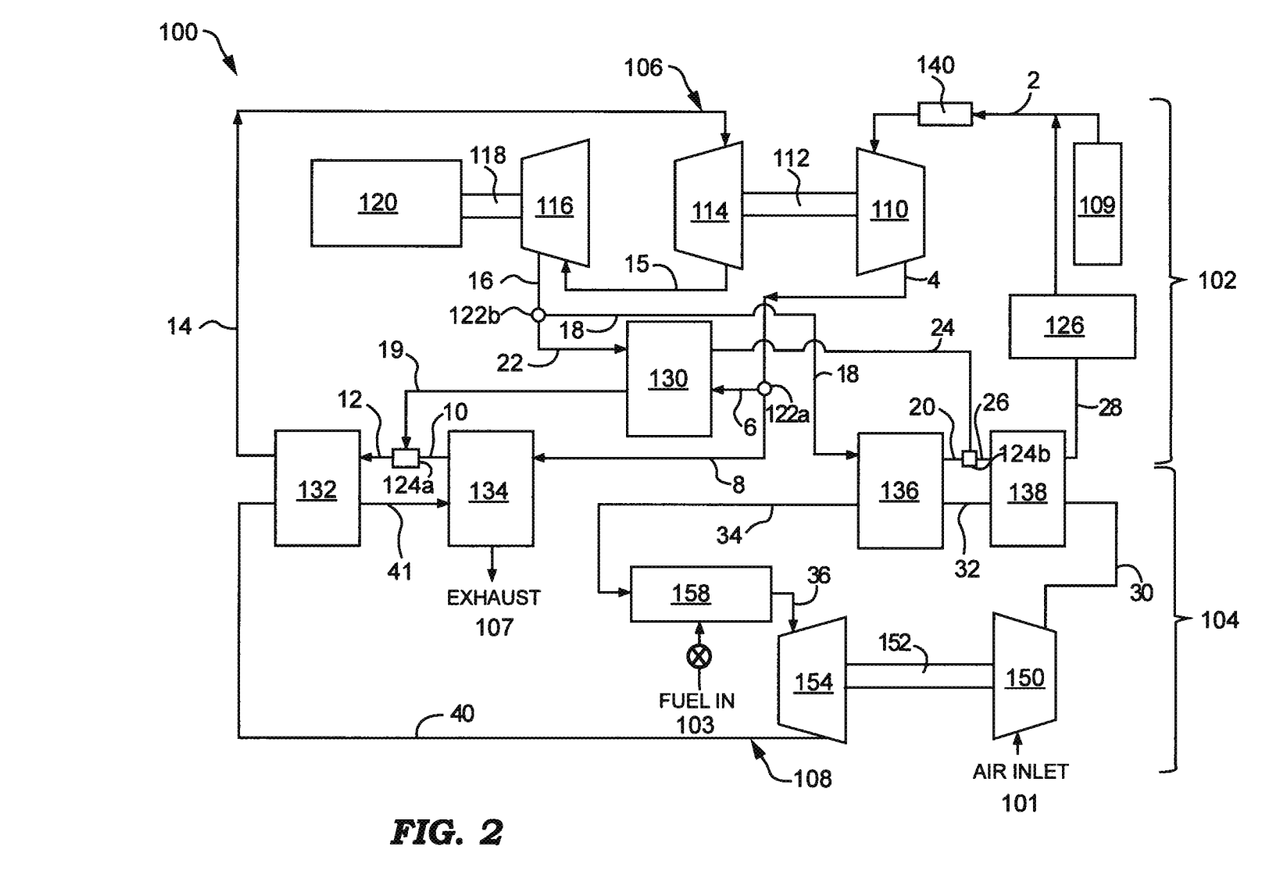
FIG. 2 is a schematic diagram of a power generation system according to an aspect of the disclosure.

FIG. 2 is a schematic diagram of a power generation system 100 according to an aspect of the disclosure. The power generation system 100 includes a first closed Brayton cycle 102, in which the working fluid may be a supercritical fluid, and a second open Brayton cycle 104, in which the working fluid may be ambient air. The first Brayton cycle 102 and the second Brayton cycle 104 include a supercritical fluid flow path 106 and an air fluid flow path 108, respectively. The flow paths 106 and 108 are, in one aspect, separate so that little or no mixing occurs between the supercritical fluid and air between the two flow paths 106 and 108.

The power generation system 100 includes compressors, turbines, one or more combustors, and a plurality of heat exchangers connected along the flow paths 106 and 108. The heat exchangers include a plurality of cross-cycle heat exchangers 132, 134, 136, and 138. As used herein, the term "cross cycle heat exchanger" refers to a heat exchanger that receives air or both air and combustion gas from the air breathing cycle 104 as well as a supercritical fluid from the supercritical fluid cycle 102 and transfers heat between the fluids in the two cycles. Furthermore, the power generation system 100 includes a recuperating heat exchanger 130 along the supercritical fluid flow path 106. As used herein, the term "recuperating heat exchanger" refers to heat transfers between the supercritical fluid discharged from the SCO2 turbine and the supercritical fluid discharged from the SCO2 compressor in the supercritical fluid cycle 102. The power generation system 100 also may include valves 122, flow meters 140, mixing junctions 124, and one or more controllers configured to control operation of the system 100.

Initially, a stream 2 of supercritical fluid is supplied to the inlet of a compressor 110, which may be an axial, radial, reciprocating or the like type compressor. The compressor 110 may be referred to as first SCO2 compressor 110. The compressor 110 includes a shaft 112 operably connected to a turbine 114. The turbine 114 may be referred to as first SCO2 turbine 114. The flow meter 140 along the stream 2 measures a flow rate of the supercritical fluid supplied to the compressor inlet. The flow meter 140 facilities control of total SCO2 mass in the supercritical fluid cycle 102 as well as transient flow behavior. In one aspect, the supercritical fluid enters the inlet of the SCO2 compressor 110 after it has been cooled and expanded, as discussed below, to a temperature and pressure that is close to its critical point. The term "supercritical fluid" refers to a fluid in which distinct liquid and gaseous phases do not exist, and term "critical point" of a supercritical fluid refers to the lowest temperature and pressure at which the substance can be said to be in a supercritical state. The terms "critical temperature" and "critical pressure" refer to the temperature and pressure at the critical point. For carbon dioxide, the critical point is approximately 304.2° K and 7.35 MPa. In one aspect, the supercritical fluid entering the compressor 110 is cooled to within at least ±2° K of its critical point. In a further aspect, the supercritical fluid entering the compressor 110 is cooled to within ±1° K of its critical point. In yet another aspect, the supercritical fluid entering the compressor 110 is cooled to within ±0.2° K of its critical point.

After compression in the SCO2 compressor 110, the discharge stream 4 of the supercritical fluid is split into first and second portions as first and second discharge streams 6 and 8. The streams 6 and 8 may be referred to herein as compressor discharge streams 6 and 8. The split permits the first portion of the discharge stream 4 from the compressor 110 to be recuperated and the remaining portion to be heated directly by a series of heat exchangers 134 and 132 by air fluid cycling through the flow path 108. As illustrated, the discharge stream 4 is split via valve 122a which can be in electronic communication with a controller (not shown). The controller operates or actuates the valve 122a to direct flow through the flow path 106 as needed. In one aspect, the valve 122a is configured to direct between 55% to about 75% of the discharge stream 4 into the first discharge stream 6. The balance of the flow of the discharge stream 4 is directed to the second discharge stream 8. In another aspect, the valve 122a is configured to direct about 67% of the discharge stream 4 into the first discharge stream 6.

The first discharge stream 6 of the supercritical fluid is directed to the recuperating heat exchanger 130 where heat is transferred from the heated SCO2 exiting turbine 116 to the first discharge stream 6. The stream 19 of the heated SCO2 discharged from the recuperating heat exchanger 130 is directed to the junction 124a and mixed with the stream 10 of heated SCO2 that exits the cross-cycle heat exchanger 134.

The second discharge stream 8 from the SCO2 compressor 110 is directed to the cross cycle heat exchanger 134. In the cross cycle heat exchanger 134, the heat from the combustion gas in flow path 108 is transferred to the second discharge stream 8 of SCO2. The stream 10 discharged from heat exchanger 134 mixes with stream 19 of SCO2 from recuperating heat exchanger 130 at junction 124a, as discussed above. The junction 124a may be joint that is connected to conduits or it may include a mixing apparatus.

The mixed stream 12 is supplied to the cross cycle heat exchanger 132. In the cross cycle heat exchanger 132, heat is transferred from the combustion gas in the flow path 108 to the mixed stream of SCO2. The cross cycle heat exchanger 132 discharges the stream 14 of heated SCO2.

The stream 14 of heated SCO2 from the heat exchanger 132 is directed to the inlet of the first SCO2 turbine 114. The first SCO2 turbine 114 may be an axial, radial, mixed flow, or the like type turbine. The first SCO2 turbine 114 expands the SCO2 and produces shaft power that drives the SCO2 compressor 110, via shaft 112. After expansion in the first SCO2 turbine 114, the stream 15 is cycled through a second SCO2 turbine 116 that produces shaft power for a generator 120, via the shaft 118. The generator 120 can provide output power for the system 100. In an alternate aspect, the cycle 102 may include one turbine 114 with the shaft 118 connected to the turbine 114 and the generator 120. In such an aspect, the discharge stream 16 would discharge from the turbine 114 into a valve 122b.

The discharge stream 16 from the second SCO2 turbine 116 may be split into second and first portions as the discharge stream 18 and the discharge stream 22. The discharge stream 18 and the discharge stream 22 may be referred to as second and first discharge streams 18 and 22. As illustrated, the valve 122b can spilt the discharge stream 16 into the second and first discharge streams 18 and 22. The controller operates or actuates the valve 122b. In one aspect, the valve 122b is configured to direct between 70% to about 90% of the discharge stream 16 into the first discharge stream 22. The balance of the flow of the discharge stream 16 is directed to the second discharge stream 18. In another aspect, the valve 122b is configured to direct about 80% of the discharge stream 16 into the first discharge stream 22. Regardless of how the SCO2 turbine discharge stream 16 is spilt, the second discharge stream 18 is directed to the cross cycle heat exchanger 136 and cooled by the flow of air passing through the heat exchanger 136 along the flow path 108.

The first discharge stream 22 is directed to the recuperating heat exchanger 130, where heat from the discharge stream 22 is transferred to first dischargeed stream 6 from the SCO2 compressor 110. In other words, the recuperating heat exchanger 130 cools the discharge stream 22 of SCO2. The discharge stream 24 of the cooled SCO2 from the recuperating heat exchanger 130 is mixed with an incoming stream 20 from the heat exchanger 136 at a junction 124b. From the junction 124b, the mixed stream 26 is directed to the cross-cycle heat exchanger 138 which may be optional). For instance, mixed stream 26 may be directed directly to the compressor 110. As noted above, in the cross-cycle heat exchanger 138, heat from the mixed stream 26 of SCO2 is transferred to the flow path 108 of the air cycle 104. The stream 28 of cooled SCO2 is directed through a cooler 126 (which may be optional) and is returned to the inlet of the SCO2 compressor 110 as stream 2. Additional SCO2 from a supply 109 can be introduced into the stream 2 of SCO2 directed to the SCO2 compressor 110 to make up for any leakage of SCO2 from the system. In any event, the SCO2 stream 2 is returned to the inlet of the compressor 110 and the steps of compressing-heating-expanding-cooling are repeated.

Continuing with FIG. 2, the air breathing cycle 104 portion of the overall system 100 forms an open flow path 108. Initially, ambient air 101 is supplied to an air breathing compressor 150 which may be an axial, radial reciprocating, or like type compressor. The compressor 150 includes a shaft 152 operably connected to a turbine 154. The stream 30 of compressed air from the compressor 150 is then heated in the heat exchanger 138 (which may be optional) by the transfer of heat from the mixed stream 26 of SCO2 discharged from the turbine 116 via the heat exchangers 130 and 136 as discussed above. The stream 32 of heated compressed air is then directed to the heat exchanger 136, where heat from the stream 18 of SCO2 (from SCO2 turbine 116) is transferred to the stream 32 of compressed air. The discharge stream 34 is the directed to the combustor 158. The combustor 158 raises the temperature of the compressed air stream 34 above the required temperature at the turbine inlet of turbine 154. The compressor 150 can operate via shaft 152 powered by turbine 154. The combustor 158 can receive a stream of fuel 103, such as fossil fuels or other fuel type. The combustor 158 can operate by means of a solar collector or nuclear reactor to produce system heat or some may other heat source of heat including combustion of waste, biomass, or bio-derived fuels. The discharge stream 36 of the combustion gas from the combustor 158 may be directed to the turbine 154, where it is expanded. The stream 40 of expanded hot combustion gas is directed to the heat exchanger 132, where heat is transferred from the hot combustion gas to the mixed stream 12 of SCO2 discussed above. After exiting the heat exchanger 132, the stream 41 of hot combustion gas is directed to the heat exchanger 134, where heat is transferred from the hot combustion gas to the discharge stream 8 of SCO2 from the SCO2 compressor 110, as discussed above. The discharge stream 107 of the heat exchanger 134 may be exhausted into atmosphere.

In operation, the power generation system 100 will be described with reference to predicted results. For instance, the heat capacity rate can be determined by multiplying mass flow rate times the specific heat Cp, or mdot*Cp. The heat exchangers 136 and 134 have mis-matched heat capacity rates because they operate in the regime of temperatures where supercritical fluid, such as SCO2, has a more linear and flat specific heat Cp curve. See for example FIG. 4. Because the heat capacity rates at these locations are not well matched, an air mass flow rate in the air breathing cycle 104 can be lower compared to prior art system 1 shown in FIG. 1. An aspect of the present disclosure includes storing heat by creating a large difference in temperature ranges of the two flows and mismatching the heat capacity rate, which can avoid the heat pinch point problem associated with the prior art system. In one example, the supercritical fluid cycle 102 in the power generation system 100 can have a mass flow rate between about 30 and 35 Kg/sec. The air cycle 104 in the power generation system 100 can have a mass flow rate between about 7.5 and about 16.0 Kg/sec. However, the mass flow rates stated herein are not considered limiting. They may be higher or lower than the ranges provided. Furthermore, the power generation system 100 is configured to have a ratio of air mass flow rate to supercritical fluid mass flow rate of between about 0.25 and 0.50. In one aspect, the ratio of the mass flow rates is approximately 0.30. Accordingly, the mass flow rates for the air in the air-breathing cycle 104 are generally lower compared to typical power generation systems. In just one example, the air mass flow rates are about 75% below the air mass flow rates in a prior art power generation system 1, such as the aspect shown in FIG. 1 and described above. Reduced air mass flow can result in a substantial reduction in heat exchanger size, footprint, cost, weight, parasitic power requirements and the like.

Figure 3:
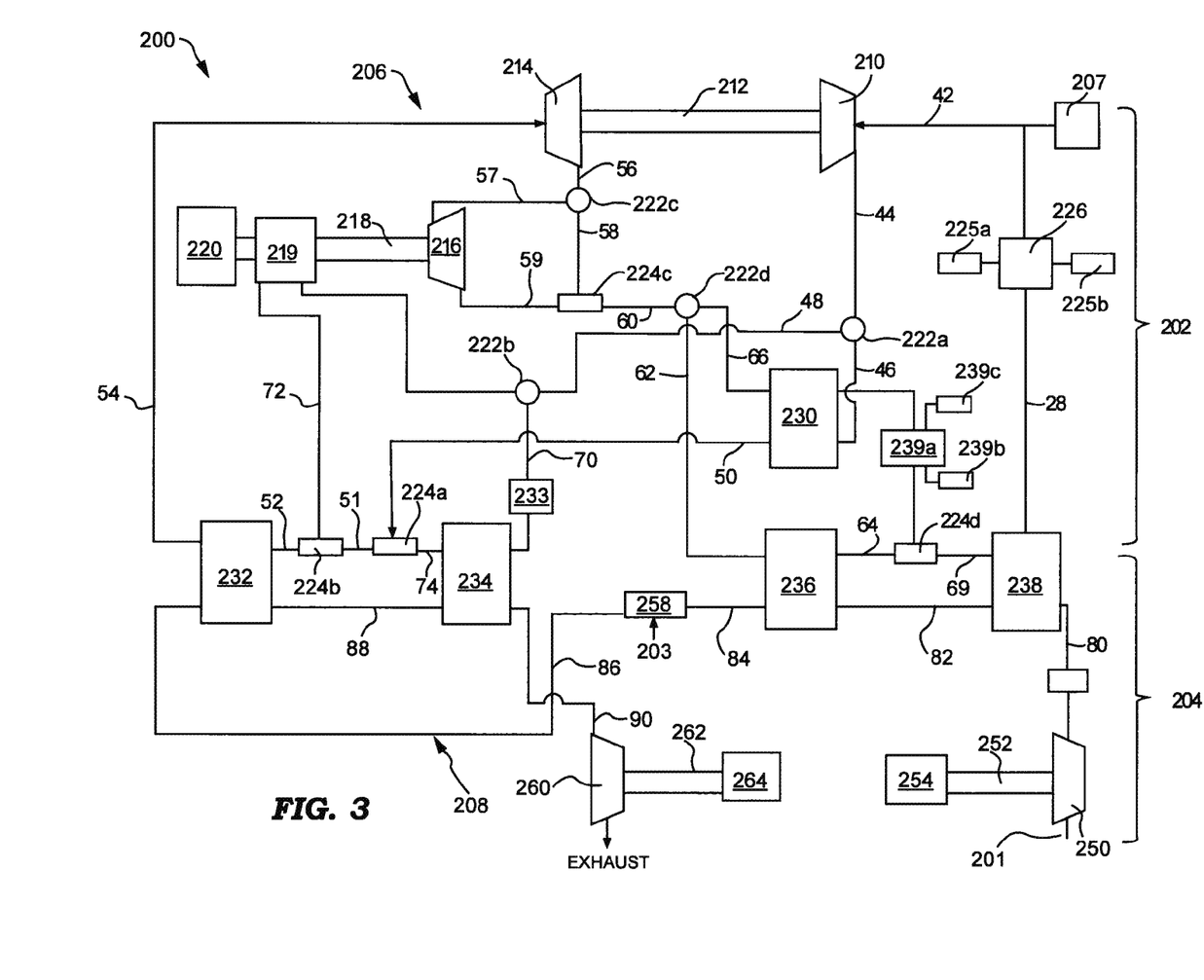
FIG. 3 is a schematic diagram of a power generation system according to another aspect of the disclosure.

Turning to FIG. 3, which is a schematic diagram of a power generation system 200 according to another aspect of disclosure configured to generate power and heat. The power generation system 200 is similar to the aspect shown in FIG. 2, and includes a first or supercritical fluid cycle 202 and a second or air-breathing cycle 204. The first and second cycles 202 and 204 include a supercritical fluid flow path 206 and an air fluid flow path 208, respectively, that are in one aspect separate from each other such the supercritical fluid and air does not intermix. Furthermore, the power generation system 200 includes compressors, turbines, one or more combustors, at least one recuperating heat exchanger 230, a plurality of cross-cycle heat exchangers 232, 234, 236, and 238, as well as valves 222, flow meters, mixing junctions 224, and one or more a controllers configured to control operation of the system.

Initially, a stream 42 of supercritical fluid is supplied to the inlet of a compressor 210. The compressor 210, sometimes referred to as the first SCO2 compressor 210, includes a shaft 212 operably connected to the first turbine 214, also referred to as the first SCO2 turbine 214. An optional flow meter (not shown) can be used measure the flow rate of the fluid supplied to the compressor inlet. The stream 42 of the supercritical fluid enters the inlet of the compressor 110 after it has been cooled and expanded to a temperature and pressure that is close to its critical point.

After compression in the compressor 210, the stream 44 of supercritical fluid is split into first and second portions as streams 46 and 48. The streams 46 and 48 may be referred to as first and second discharge streams 46 and 48, respectively. A valve 222a can split the stream 44 into the first and second discharge streams 46 and 48. The first discharge stream 46 of the supercritical fluid is supplied to the recuperating heat exchanger 230. In the recuperating heat exchanger 230, heat is transferred from the heated SCO2 discharge from a turbine 216 to the first discharge stream 46 from the SCO2 compressor 210. The stream 50 of heated SCO2 discharged from heat exchanger 230 is directed to a junction 224a and mixed with the stream 74 of heated SCO2 from a cross-cycle heat exchanger 234.

The second discharge stream 48 is directed to a valve 222b, which directs the stream 70 through an optional heat exchanger 233 and into the cross cycle heat exchanger 234. Exchanger 233 can be used to capture waste heat from avionics and weapons systems that are installed in moving platforms like aircraft, surface vessels, etc. The system 200 may not include heat exchanger 233 in every application or implementation. In the cross cycle heat exchanger 234, the heat is transferred from the combustion gas in the flow path 208 to the discharge stream 70 of SCO2. The stream 74 discharged from heat exchanger 234 mixes with stream 50 at a junction 224a. The junction 224a may be a joint or may include a mixing apparatus. The stream 51 is supplied to another junction 224b and combined with the discharge stream 72 from a cooler 219. The valve 222b also may direct a portion of a second discharge stream 48 to the cooler 219 disposed along a shaft 218. The discharge stream 72 from the cooler 219 is routed to the junction 224b combined with the stream 51 into mixed the stream 52. The mixed stream 52 is supplied to the cross cycle heat exchanger 232. In the cross cycle heat exchanger 232, heat from the combustion gas in the flow path 108 is transferred to the mixed stream 52. The discharge stream 54 of heated SCO2 from the cross cycle heat exchanger 232 is directed to the inlet of the first SCO2 turbine 214.

The first SCO2 turbine 214 expands the SCO2 and produces shaft power that drives the SCO2 compressor 210, via shaft 212. After expansion in the first SCO2 turbine 214, the stream 56 is cycled through a second SCO2 turbine 216 that produces shaft power for a generator 220, via the shaft 218. The generator 220 can provide output power for the system 200. Alternatively, the stream 56 can bypass the turbine 216. As illustrated, a valve 222c divides the stream 56 into a stream 57 directed toward the turbine 216 and the stream 58 directed toward the heat exchangers 130 and 236. The stream 59 discharged from the turbine 216 flows to a junction 224c and is combined with the stream 58 to define a discharge stream 60.

The discharge stream 60 is directed to a valve 222d, which splits the discharge stream 60 from the turbine 216 into a second discharge stream 62 and a first discharge stream 66. The second discharge stream 62 is directed to a cross cycle heat exchanger 236 and heated by the flow of air along a flow path 208 through the heat exchanger 236. The discharge stream 64 discharged from the heat exchanger 236 is directed toward the heat exchanger 238. The first discharge stream 66 of SCO2 is directed to the recuperating heat exchanger 230, where its heat is transferred to the first discharge stream 4 of SCO2 from the SCO2 compressor 210. The discharge stream 68 from the recuperating heat exchanger 230 is mixed with a discharge stream 64 from the heat exchanger 236 at a junction 224d, forming a mixed stream 69. The mixed stream 69 of SCO2 is directed to the heat exchanger 238, where heat from the SCO2 fluid is transferred to compressed air along the flow path 208 of the air cycle 204. The stream 28 of cooled SCO2 is directed through a cooler 226 (which may be optional) and is returned to the inlet of the SCO2 compressor 210 via the flow path 206. A water input 225a may supply water to a cooler 226. The output stream 225b of the cooler 226 is heated water, which can be used as a heat source. Additional SCO2 from a supply 207 can be introduced into the stream 42 of SCO2 directed to the compressor 210 to make up for any leakage of SCO2 from the system. In any event, the SCO2 stream 202 is returned to the inlet of the compressor 210 and the steps of compressing-heating-expanding-cooling are repeated. In an alternative aspect, yet another heat exchanger 239a is placed along stream 68. A water input 239b may supply water to exchange 239a. The output stream 239c of the heat exchanger 239a is heated water which can be used as a heat source for district heating. District heating generally requires water temps of 180 F or better, including heat exchanger 239a can help ensure output stream temperature of about 180 F or better, as opposed to system 200 that include only the cooler 226. Accordingly, the system 200 may include cooler 226 or heat exchanger 239a. In still other alternatives, the system 200 can include both cooler 226 and heat exchanger 239a.

Continuing with FIG. 3, the air breathing cycle 104 portion of the overall system 200 forms open flow path 208. Initially, ambient air 201 is supplied to a forced draft fan 250 which may be axial, radial, reciprocating, or similar type compressor. The forced draft fan 250 is driven by shaft 252 powered by a power source 254. The power source 254 can be a motor. The stream 80 of compressed air from the forced draft fan 250 is then heated in the heat exchanger 238 by the transfer of heat from the mixed stream 69 of SCO2 (discharged from turbine 216 and cooled in the heat exchanger 230 and 236). The air stream 82 of heated compressed air is then directed the heat exchanger 236, where heat from the second discharge stream 62 of heated SCO2 is transferred to an air stream 82. The air stream 84 is fed to a combustor 258 into which a fuel 203 (such as a fossil fuel, heat from solar conductor, nuclear reactor, or the like is supplied) is introduced by a fuel controller and combusted in the air so as to produce hot combustion gas. The stream 86 of the combustion gas from the combustor 258 is directed to a heat exchanger 232, where heat is transferred from the stream 86 of hot combustion gas to the mixed stream 52 of SCO2 discussed above. The stream 88 of hot combustion gas directed to the heat exchanger 234, where heat is transferred from the hot combustion gas to the stream 74 of compressed SCO2, as discussed above. The discharge stream 90 of the heat exchanger 234 may be directed to an induced draft fan 260, which may be a compressor. The induced draft fan 250 may be connected to a shaft 262, which is powered by a power source 264, such as a motor. The stream of gas may be exhausted from the induced draft fan 260 to atmosphere. The purpose of both forced draft fan 250 and induced draft fan 260 is to drive flow through the heat exchangers and combustor and to overcome the pressure drop associated with them. It should be appreciated that the forced draft fan 250 may not be needed based on the type of fuel burnt in the combustor. For instance, a forced draft fan 250 is useful when it is desirable for the combustion zone to be sub-atmospheric pressure in the case of burning biomass where fuel is introduced through an open door. If, however, the combustor can be pressurized, as in the case of burning fossil fuels, the induced fan 260 is not necessary.

In operation and as described above with respect to the system 100, the heat exchangers 236 and 234 have mis-matched heat capacity rates because they both operate in the regime of temperatures where the supercritical fluid has a more linear and flat heat capacity rate curve. Because the heat capacity rates at these locations are not well matched, an air mass flow rate in the air breathing cycle 204 can be lower compared to prior art system 1 shown in FIG. 1. An aspect of the present disclosure includes storing heat by creating a large difference in temperature ranges of the two flows and mis-matching the heat capacity rate, which can avoid the heat pinch point problem associated with the prior art system. In one example, the supercritical fluid cycle 202 in the power generation system 200 can have a mass flow rate between about 30 and 35 Kg/sec. The air cycle 204 in the power generation system 200 can have a mass flow rate between about 7.5 and about 16.0 Kg/sec. However, the mass flow rates stated herein are not considered limiting. They may be higher or lower than the ranges provided. Furthermore, the power generation system 200 is configured to have a ratio of air mass flow rate to supercritical fluid mass flow rate of between about 0.25 and 0.50. In one aspect, the ratio of the mass flow rates is approximately 0.30. Accordingly, the mass flow rates for the air in the air-breathing cycle 204 are generally lower compared to typical power generation systems. In just one example, the air mass flow rates are about 75% below the air mass flow rates in a prior art power generation system 1.

Figure 4:
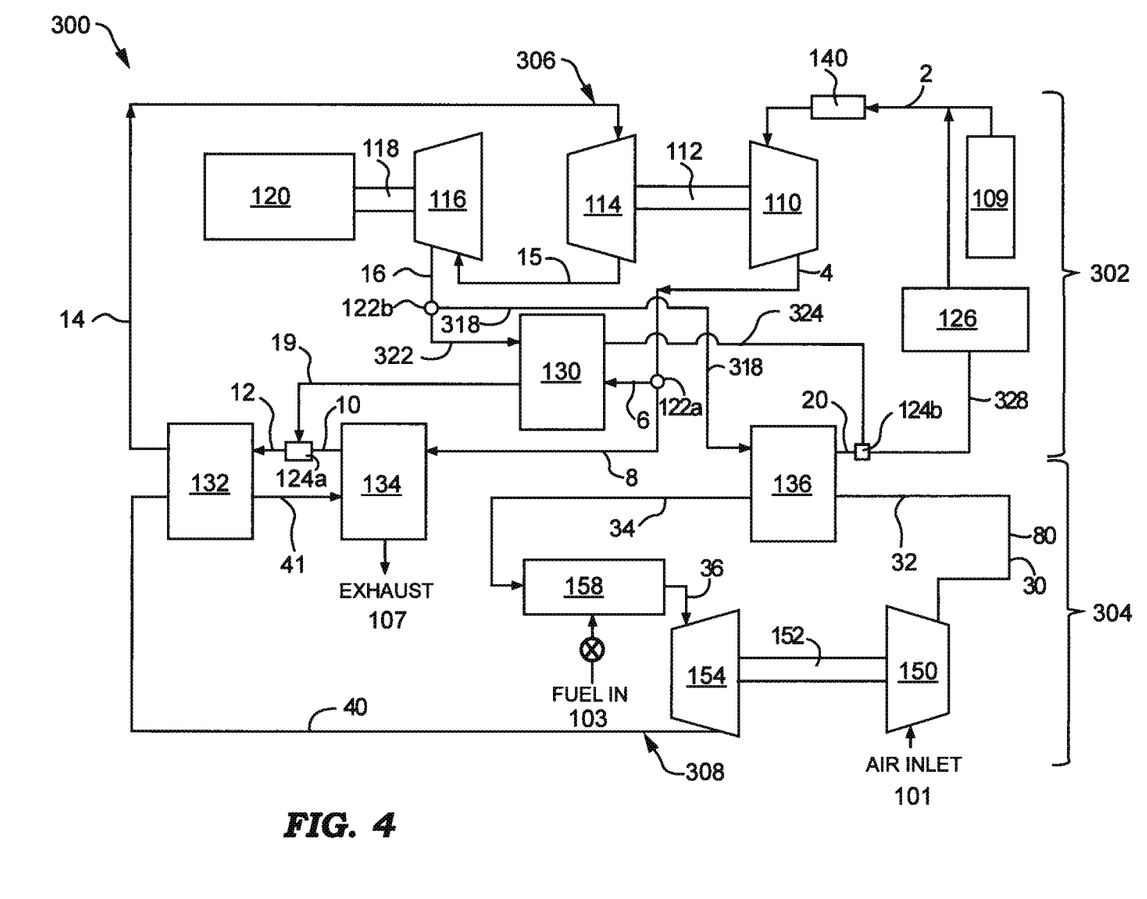
FIG. 4 is a schematic diagram of a power generation system according to another aspect of the disclosure.
Figure 5:
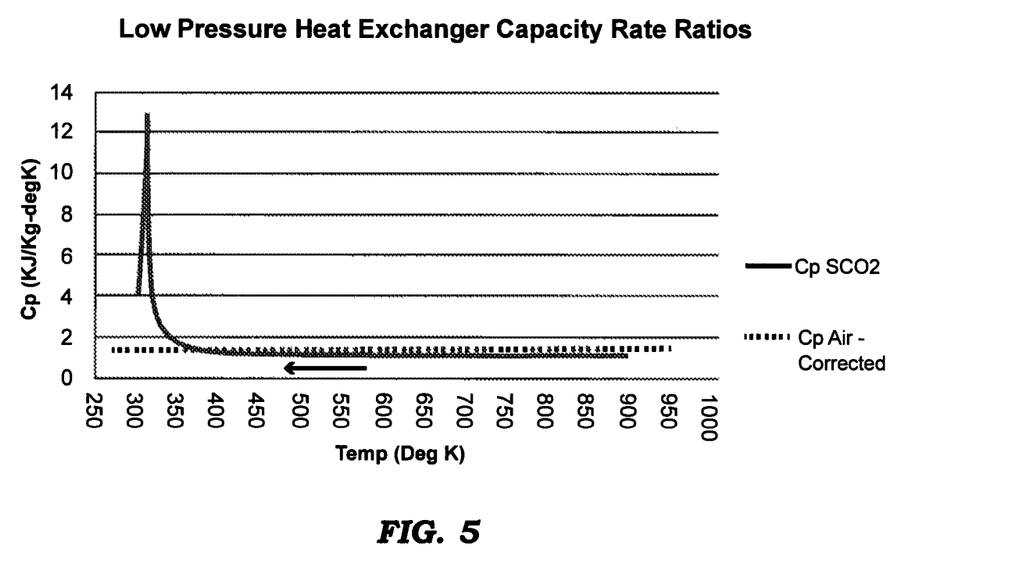
FIG. 5 is a chart illustrating heat exchanger capacity rate ratios for supercritical fluid and air according to the prior art power generation system illustrated in FIG. 1.

Turning to FIG. 4, which is a schematic diagram of a power generation system 300 according to another aspect of disclosure. The power generation system 400 is substantially similar to the power generation system 100 shown in FIG. 2 and described above. The description below will use the same reference numbers to identify elements that are common between power generation system 100 and power generation system 300. Accordingly, the power generation system 300 a supercritical fluid cycle 402 and an air breathing cycle 404. Furthermore, the power generation system 300 includes compressors, turbines, one or more combustors, and a plurality of heat exchangers connected along the flow paths 306 and 308. The heat exchangers include a plurality of cross-cycle heat exchangers 132, 134 and 136 along the flow path 308, and a recuperating heat exchanger 130 along the supercritical fluid flow path 306. The power generation system 300 also may include valves 122, flow meters 140, mixing junctions 124, and one or more controllers configured to control operation of the system 300. As noted above, the power generation system 300 operates substantially similar to the power generation system 100.

In accordance with the alternative aspect of the disclosure, however, the power generation system 300 does not include a terminal heat exchanger 138 that discharges stream 28 toward the inlet of the compressor 110 (see FIG. 2). In accordance with the power generation system 300, the valve 122b divides the discharge stream 16 from the second SCO2 turbine 116 into second discharge stream 318 and a first discharge stream 322. In one aspect, the controller operates or actuates the valve 122b to direct between 70% to about 90% of the discharge stream 16 into the first discharge stream 322. The balance of the flow of the discharge stream 16 is directed to the second discharge stream 318. In another aspect, the valve 122b is configured to direct about 80% of the discharge stream 16 into the first discharge stream 322. Regardless of how the SCO2 turbine discharge stream 16 is spilt, the second discharge stream 318 is directed to the cross cycle heat exchanger 136 and cooled by the flow of air passing through the heat exchanger 136 along the flow path 408.

The first discharge stream 322 is directed to the recuperating heat exchanger 130, where heat from the discharge stream 322 is transferred to first discharged stream 6 from the SCO2 compressor 110. The discharge stream 324 of the cooled SCO2 from the recuperating heat exchanger 130 is mixed with an incoming stream 20 from the heat exchanger 136 at a junction 124b. From the junction 124b, the mixed stream 328 is directed to the compressor 110. As illustrated, the stream 328 of cooled SCO2 is directed through a cooler 126 (which may be optional) and is returned to the inlet of the SCO2 compressor 110 as stream 2. In any event, the SCO2 stream 2 is returned to the inlet of the compressor 110 and the steps of compressing-heating-expanding-cooling are repeated.

Continuing with FIG. 4, the air breathing cycle 304 portion of the overall system 300 forms an open flow path 408. Initially, ambient air 101 is supplied to an air breathing compressor 150. The stream 30 of compressed air from the compressor 150 is directed to heat exchanger 136 and is heated by the transfer of heat from the stream 318 of SCO2 discharged from the turbine 116. The discharge stream 34 is the directed to the combustor 158. The discharge stream 36 of the combustion gas from the combustor 158 may be directed to the turbine 154, where it is expanded. The stream 40 of expanded hot combustion gas is directed to the heat exchanger 132, where heat is transferred from the hot combustion gas to the mixed stream 12 of SCO2 as discussed above. After exiting the heat exchanger 132, the stream 41 of hot combustion gas is directed to the heat exchanger 134, where heat is transferred from the hot combustion gas to the discharge stream 8 of SCO2 from the SCO2 compressor 110. The discharge stream 107 of the heat exchanger 134 may be exhausted into atmosphere.

The power generation system 300 requires fewer cross-cycle heat exchangers compared to other aspects of the present disclosure. Furthermore, it should be appreciated that the power generation system 200 can be implemented without the need for heat exchanger 238. In such an example, the stream 69 is directed to directly to the optional cooler and then the inlet of compressor 210. Furthermore, on the air-breathing cycle 204, the discharge stream 80 is directed into heat exchanger 236 and the cycle continues as disrobed above.

Figure 6:
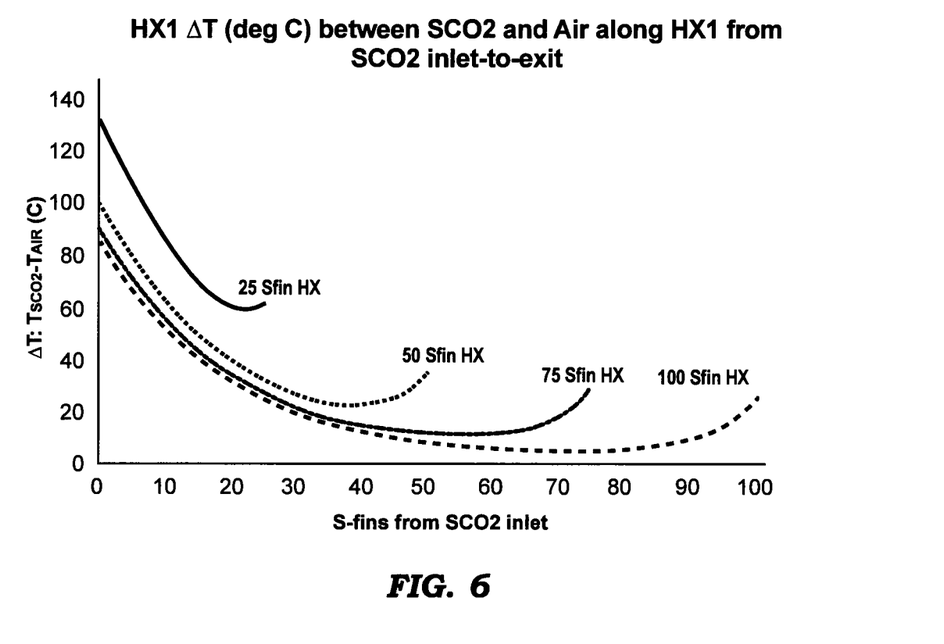
FIG. 6 is a chart showing delta temperature between supercritical flow and air flow along a heat exchanger from inlet-to-exit as a function of fin location according to the prior art system illustrated in FIG. 1.
Figure 7:
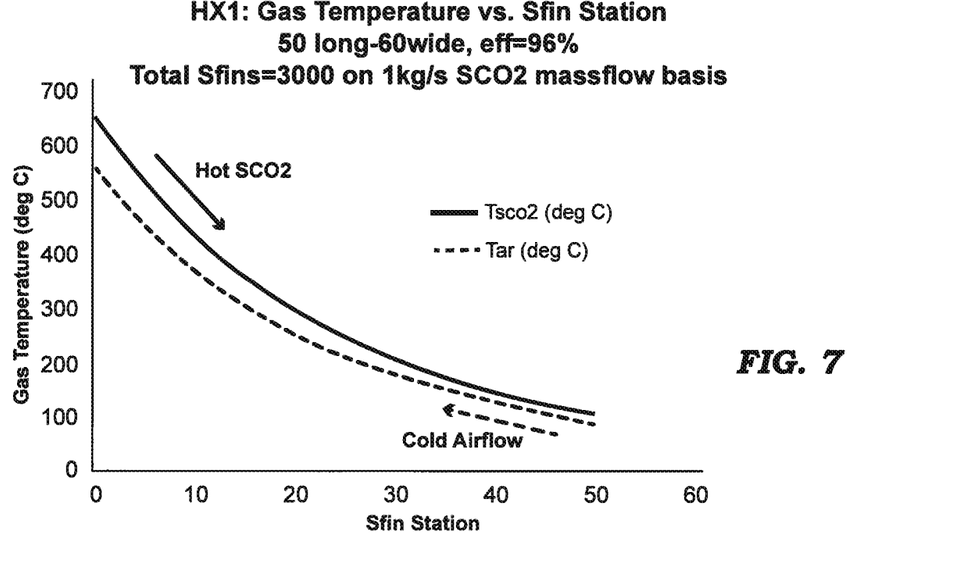
FIG. 7 is a chart illustrating temperature as a function of fin station in a first heat exchanger according to an aspect of the disclosure.
Figure 8:
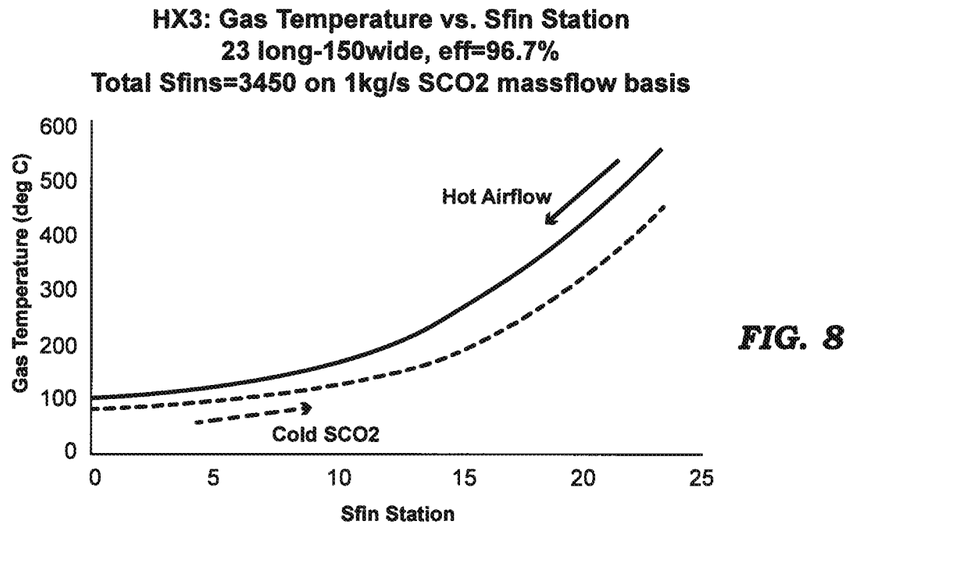
FIG. 8 is a chart illustrating temperature as a function of fin station in a third heat exchanger along a partially recuperated cycle according to an aspect of the disclosure.

The power generation systems 100, 200, and 300 described above have several advantages over typical supercritical power generation systems and/or or other non-supercritical fluid based systems. Reduced heat exchanger size, improved thermal efficiency, and lower thermal signature at exhaust are a few notable improvements. The alternative heat exchanger flow strategy—whereby SCO2 discharge flows from the SCO2 compressor and SCO2 turbine are spilt—mitigates a so-called heat exchanger "pinch point" in the prior art system 1. More specifically, the prior art system 1 has a variable heat capacity mismatch at heat exchanger 418 (FIG. 1) on the low pressure side. The variable mismatch is based on a mismatch between the heat capacity rate of the air and SCO2 flows that are exchanging heat in the heat exchanger 418. For instance, as shown in FIG. 4, the air in the heat exchanger 418 has a fairly linear heat capacity rate curve across its operating temperatures. The supercritical fluid, however, has a spike in the heat capacity rate at the lower temperature range where the SCO2 discharge end of the heat exchanger 418 operates. The effect of this spike in heat capacity rate is illustrated in FIG. 6. FIG. 6 displays delta temperature ($\Delta T$) between the inlet and exit ends of the heat exchanger 418 for both SCO2 flow and air flow as function of S-fins from the SCO2 inlet. The different curves are different sized heat exchangers. For instance, the curve "100-Sfin Hx" would indicate a larger heat exchanger compared to the heat exchanger associated with the "50-Sfin Hx" curve. As noted above, the spike heat capacity rate of SCO2 at lower temperature at the SCO2 discharge end indicates that the heat exchanger length should be increased in order to create effective heat transfer. But as shown in FIG. 6, a relative low $\Delta T$ observed from 50-fins location to about the 100-fins location relative to the SCO2 inlet end of heat exchanger for the 100-Sfin HX curve. This suggests that the section of the heat exchanger which is doing the least amount of heat transfer is actually elongated. The result is that the prior art system 1 requires fairly large heat exchangers with limited or low performance and sometimes high loss of pressure, which can be detrimental to the system performance. Furthermore, large approach temperatures at either end of the heat exchanger 418 illustrate that a significant amount of heat is left un-transferred.

As described above, the power generation systems 100, 200, 300 splits the discharge flows of SCO2 from the SCO2 compressor 110, 210, and the SCO2 turbine 116, 216, between: A) the recuperating heat exchanger 130, 230, and B) heat exchangers that feed into the respective inlets of the SCO2 turbine and SCO2 compressor. This split, in conjunction with the arrangement of the air-breathing cycle 104, 204, 304 results in airflow stream (see stream 40 in FIGS. 2 and 4 and stream 86 in FIG. 3) on the inlet side of the SCO2 turbines with a temperature above the desired temperature of SCO2 stream at inlet of SCO2 turbine 114, 214. Furthermore, the splitting of SCO2 turbine discharge flow and SCO2 compressor discharge flow allows for the intentional mismatch of heat capacity rate at heat exchanger 138, 238 and heat exchanger 132, 232, as in FIGS. 2 and 3. For the power generation system 300 shown in FIG. 4, this intentional mismatch of heat capacity rate would be between heat exchanger 136 and heat exchanger 132. This in turn, permits somewhat large approach temperatures at the hot end of the heat exchanger 132, 232 and the cool end of heat exchanger 138, 238 in FIGS. 2 and 3 and cool end of heat exchanger 136 in FIG. 4. The large approach temperatures alleviate the "pinch point" issue for these particular heat exchangers as used in prior art systems. For the power generation systems 100 and 200 shown in FIGS. 2 and 3, the heat exchangers 134, 234 and 136, 236, however, have fairly well matched heat capacity rates because they operate in a range where SCO2 has a more linear Cp curve. In any event, the high approach temperatures at heat exchanger 132, 232 and heat exchanger 138, 238 increase the amount of heat exchanged per unit area of heat exchanger, further reducing heat exchanger size. And in at least some instances allows the elimination of the heat exchanger 138, 238, as in the power generation system 300 shown in FIG. 4.

System heat can be added to by means of combustion of fossil fuels, a solar collector, a nuclear reactor, and/or similar heat source, thereby raising the temperature of the air flow to a value above the required high temperature at the inlet of the SCO2 turbines. Furthermore, because the heated combustion gas passes the majority of its heat to SCO2 streams via the heat exchangers 134, 234 and 132, 232, very low exhaust gas temperatures result and thus reductions in thermal signature for applications where this is important, e.g., such as military applications. And because of the low compressibility factor associated with supercritical fluids, the discharge temperature from the SCO2 compressor is comparatively low and therefore ideal for receiving the heat energy from the heated combustion gas at the heat exchanger 134, 234 and the SCO2 discharge flow at the recuperating heat exchanger 130, 230. These attributes result is high thermal efficiency of the system.

In alternative aspects, a power generation system includes more than one supercritical fluid cycle. In one example, the power generation system can include first and second supercritical fluid cycles, whereby one or both of the first and second supercritical fluid cycles spilt the SCO2 discharge from the SCO2 turbine and SCO2 compressor between A) a recuperating heat exchanger like 130, 230, and B) respective heat exchanger in-line with inlets of a SCO2 turbine and a SCO2 compressor. In still other alternative aspects, a power generation system includes one or more air breathing cycles. In still other aspects, the air breathing cycle can include one or more reheat cycles. In still other aspects, a power generation system includes a vacuum cycle with one or more SCO2 cycles. In still other aspects, a power generation system includes steam injection. In still other aspects a power generation system includes a bottoming cycle using the low pressure discharge stream of heat exchangers 130, 230 as a heat source.

Furthermore, the power generation system 100, 200, 300 an include various SCO2 and air breathing cycles as disclosed in U.S. Patent App. Pub. No. 2013/0180259 (the 259 publication) in combination with the alternative flow strategy as described herein. The disclosure of the SCO2 and the air breathing cycles in the 259 publication that are not inconsistent with the flow strategies as described above are incorporated herein by reference in its entirety.

In another alternative aspect, the power generation system 100, 200 as described herein includes a SCO2 turbine assembly that includes an eddy current torque coupling as disclosed in the 259 publication. The disclosure of the eddy current torque coupling in the 259 publication is incorporated by reference into this application in its entirety.

Applications for the power generation systems 100, 200, 300 include but are not limited to aircraft engines (such as turbo-fan, turbo-prop, or turbo-shaft engines), ground based electric power generators, naval propulsion systems, ground transportation engines, etc. Furthermore, other applications can include power and heat generation, such as steam and hot water. The systems can be used for any other application where shaft power is required.

The foregoing description is provided for the purpose of explanation and is not to be construed as limiting the invention. While the invention has been described with reference to preferred aspects or preferred methods, it is understood that the words which have been used herein are words of description and illustration, rather than words of limitation. Furthermore, although the invention has been described herein with reference to particular structure, methods, and aspects, the invention is not intended to be limited to the particulars disclosed herein, as the invention extends to all structures, methods and uses that are within the scope of the appended claims. Those skilled in the relevant art, having the benefit of the teachings of this specification, may effect numerous modifications to the invention as described herein, and changes may be made without departing from the scope and spirit of the invention as defined by the appended claims.

The invention claimed is:

1. A method for generating power in a system that includes a supercritical fluid cycle having a supercritical fluid flowing therethrough, an air-breathing cycle having air flowing therethrough that does not mix with the flow of the supercritical fluid, the method comprising:
   directing air along the air-breathing cycle to flow through a plurality of heat exchangers;
   compressing the supercritical fluid in a supercritical fluid compressor along the supercritical fluid cycle;
   splitting the supercritical fluid discharged from the supercritical fluid compressor into first and second discharge streams of compressed supercritical fluid, such that the first discharge stream of compressed supercritical fluid flows through a recuperating heat exchanger;
   mixing the supercritical fluid discharged from the recuperating heat exchanger with the second discharge stream of compressed supercritical fluid;
   directing a mixture of compressed supercritical fluid through one of the plurality of heat exchangers arranged and into an inlet of a supercritical fluid turbine, such that heat from the air along the air-breathing cycle is transferred to the mixture of compressed supercritical fluid;
   splitting the supercritical fluid discharged from the supercritical fluid turbine into a first and second discharge streams of expanded supercritical fluid such that the first discharge stream of expanded supercritical fluid flows through the recuperating heat exchanger so as to heat the first discharge stream of compressed supercritical fluid;
   mixing the expanded supercritical fluid discharged from the recuperating heat exchanger with the second discharge stream of expanded supercritical fluid; and
   directing a mixture of expanded supercritical fluid toward the inlet of the supercritical compressor,
   wherein heat from the mixture of expanded supercritical fluid is transferred to the air of the air-breathing cycle, thereby cooling the mixture of expanded supercritical fluid to approximately its critical point.

2. The method of claim 1 wherein the third directing step includes directing a mixture of expanded supercritical fluid through another one of the plurality of heat exchangers and into to the inlet of the supercritical compressor.

3. The method of claim 2, wherein the plurality of heat exchangers includes a first heat exchanger, a second heat exchanger, a third heat exchanger, and a fourth heat exchanger, wherein the air flows in a direction from the first heat exchanger to the second, third and fourth heat exchangers in sequence.

4. The method of claim 3, wherein the second directing step includes directing the mixture of compressed supercritical fluid through the third heat exchanger arranged to feed into an inlet of the supercritical fluid turbine.

5. The method of claim 4, prior to the first mixing, directing the second discharge stream of compressed supercritical fluid through the fourth heat exchanger.

6. The method of claim 3, wherein the third directing step includes directing the mixture of expanded supercritical fluid through the first heat exchanger.

7. The method of claim 4, prior to the second mixing, directing the second discharge stream of expanded supercritical fluid through the second heat exchanger.

8. The method of claim 1, wherein the plurality of heat exchangers includes a first heat exchanger, a second heat exchanger, and a third heat exchanger, wherein the air flows in a direction from the first heat exchanger to the second and third heat exchangers in sequence.

9. The method of claim 8, wherein the second directing step includes directing the mixture of compressed supercritical fluid through the second heat exchanger arranged to feed into an inlet of the supercritical fluid turbine.

10. The method of claim 9, prior to the first mixing, directing the second discharge stream of compressed supercritical fluid through the third heat exchanger.

11. The method of claim 8, wherein the third directing step includes directing the mixture of expanded supercritical fluid through the first heat exchanger.

12. The method of claim 8, prior to the second mixing, directing the second discharge stream of expanded supercritical fluid through the first heat exchanger.

13. The method of claim 1, wherein the first directing includes:
compressing the flow of air in an air cycle compressor; and
expanding the air through an air cycle turbine.

14. The method of claim 13, wherein the plurality of heat exchangers includes a first heat exchanger, a second heat exchanger, and a third heat exchanger, wherein the air flows in a direction from the first heat exchanger to the second and third heat exchangers in sequence, wherein the expanding occurs prior to the air flowing through the third exchanger.

15. The method of claim 1, wherein the first directing comprises combusting the air before the air flows through the heat exchangers.

16. The method of claim 13, further comprising exhausting the flow of air.

17. The method of claim 16, wherein air flow is exhausted from one of the heat exchangers.

18. The method of claim 16, wherein air flow is exhausted from the air cycle turbine.

19. The method of claim 1, further comprising cooling the supercritical fluid via one or more coolers.

20. A system configured to generate power, comprising:
a supercritical fluid cycle including a supercritical fluid compressor configured to receive and compress a supercritical fluid, a supercritical fluid turbine configured to receive and expand the supercritical fluid, and a recuperating heat exchanger configured to receive discharge streams from the supercritical fluid compressor and the supercritical fluid turbine;
an air breathing cycle configured to heat air flowing along the air breathing cycle; and
a plurality of heat exchangers arranged so that supercritical fluid from the supercritical fluid cycle and air from the an air breathing cycle passes therethrough but does not intermix,
wherein the system is configured to:
1) split the supercritical fluid discharged from the supercritical fluid compressor into first and second discharge streams of compressed supercritical fluid, such that a) the first discharge stream of compressed supercritical fluid flows through the recuperating heat exchanger, and b) the second discharge stream of compressed supercritical fluid flows through one set of the plurality of heat exchangers; and
2) split the supercritical fluid discharged from the supercritical fluid turbine into a first and second discharge streams of expanded supercritical fluid such that a) the first discharge stream of expanded supercritical fluid flows through the recuperating heat exchanger, and b) the second discharge stream of expanded supercritical fluid flows through a different set of the plurality of heat exchangers, wherein heat from the first discharge stream of expanded supercritical fluid is transferred to the first discharge stream of the compressed supercritical fluid in the recuperating heat exchanger.

21. The system of claim 20, wherein the plurality of heat exchangers includes a first heat exchanger, a second heat exchanger, and a third heat exchanger, wherein the air flows in a direction from the first heat exchanger to the second, and third heat exchangers in sequence.

22. The system of claim 21, wherein the system is configured so that the second discharge stream of compressed supercritical fluid flows through the third heat exchanger, which in turn, directs the stream to the second heat exchanger arranged to feed into an inlet of the supercritical fluid turbine.

23. The system of claim 22, wherein the system in configured to A) mix the discharge from the third heat exchanger with the discharge of compressed supercritical fluid from the recuperating heat exchanger, and B) direct the mixture of compressed supercritical fluid through the second heat exchanger into the inlet of the supercritical fluid turbine.

24. The system of claim 22, wherein the system is configured so that the second discharge stream of expanded supercritical fluid flows through the first heat exchanger, which in turn, directs the stream toward the inlet of the supercritical fluid compressor.

25. The system of claim 24, wherein the system is configured to A) mix the discharge from first heat exchanger with the discharge of expanded supercritical fluid from the recuperating heat exchanger, and B) direct the mixture of expanded supercritical fluid toward the inlet of the supercritical fluid compressor.

26. The system of claim 20, wherein the plurality of heat exchangers includes a first heat exchanger, a second heat exchanger, a third heat exchanger, and a fourth heat exchanger, wherein the air flows in a direction from the first heat exchanger to the second, third and fourth heat exchangers in sequence.

27. The system of claim 26, wherein the system is configured so that the second discharge stream of compressed supercritical fluid flows through the fourth heat exchanger, which in turn, directs the stream the third heat exchanger.

28. The system of claim 27, wherein the system in configured to A) mix the discharge from fourth heat exchanger with the discharge of compressed supercritical fluid from the recuperating heat exchanger, and B) direct the mixture of compressed supercritical fluid through the third heat exchanger into an inlet of the supercritical fluid turbine.

29. The system of claim 28, wherein the system is configured so that the second discharge stream of expanded supercritical fluid flows through the second heat exchanger, which in turn, directs the stream to the first heat exchanger.

30. The system of claim 29, wherein the system is configured to A) mix the discharge from second heat exchanger with the discharge of expanded supercritical fluid from the recuperating heat exchanger, and B) direct the mixture of expanded supercritical fluid through first heat exchanger and toward the inlet of the supercritical fluid compressor.

31. The system of claim 20, further comprising:
a first valve configured to split the supercritical fluid discharged from the supercritical fluid compressor into the first and second discharge streams of compressed supercritical fluid; and
a second valve configured to split the supercritical fluid discharged from the supercritical fluid turbine into the first and second discharge streams of expanded supercritical fluid.

32. The system of claim 20, further comprising a cooler that reduces the temperature of the supercritical fluid prior to its entry into the supercritical fluid compressor.

33. The system of claim 20, wherein the air breathing cycle includes at least one air cycle compressor, at least one air cycle turbine, and at least one combustor.

34. The system of claim 20, wherein the air breathing cycle includes at least one induced draft fan, at least one forced draft fan, and at least one combustor.

35. The system of claim 33, wherein the induced draft fan includes a first power source and the forced draft fan includes a second power source.

36. A system configured to generate power, comprising:
a supercritical fluid cycle including a supercritical fluid compressor configured to receive and compress a supercritical fluid, a supercritical fluid turbine configured to receive and expand the supercritical fluid, and a recuperating heat exchanger configured to receive discharge streams from the supercritical fluid compressor and the supercritical fluid turbine;
an air breathing cycle configured to heat air flowing along the air breathing cycle; and
a plurality of heat exchangers arranged so that supercritical fluid from the supercritical fluid cycle and air from the an air breathing cycle passes therethrough but does not intermix, wherein a first heat exchanger of the plurality of heat exchangers is arranged to feed into an inlet of the supercritical fluid turbine, and a second heat exchanger of the plurality of heat exchangers is arranged to feed into an inlet of the supercritical fluid compressor, wherein the first heat exchanger has a first heat capacity rate and the second heat exchanger has a second heat capacity rate that is substantially different than the first heat capacity rate;
wherein the system is configured to
1) split the supercritical fluid discharged from the supercritical fluid compressor into first and second discharge streams of compressed supercritical fluid, such that a) the first discharge stream of compressed supercritical fluid flows through the recuperating heat exchanger, and b) the second discharge stream of compressed supercritical fluid flows through the first heat exchanger of the plurality of heat exchangers, and
2) split the supercritical fluid discharged from the supercritical fluid turbine into a first and second discharge streams of expanded supercritical fluid such that a) the first discharge stream of expanded supercritical fluid flows through the recuperating heat exchanger, and b) the second discharge stream of expanded supercritical fluid flows through the second heat exchanger of the plurality of heat exchangers.

37. The system of claim 36, wherein the first and second heat exchangers are configured to receive respective flows at temperature ranges that are substantially different with respect to each other.

38. The system of claim 36, further comprising one or more valves.

39. The system of claim 38, where the one or more valves is A) a first valve configured to split the supercritical fluid discharged from the supercritical fluid compressor into the first and second discharge streams of compressed supercritical fluid, and B) a second valve configured to split the supercritical fluid discharged from the supercritical fluid turbine into the first and second discharge streams of expanded supercritical fluid.

40. The system of claim 36, further comprising a cooler that reduces the temperature of the supercritical fluid prior to its entry into the supercritical fluid compressor.

41. The system of claim 36, wherein the air breathing cycle includes at least one air cycle compressor, at least one air cycle turbine, and at least one combustor.

42. The system of claim 36, wherein the air breathing cycle includes at least one induced draft fan, at least one forced draft fan, and at least one combustor.

43. The system of claim 42, wherein the induced draft fan includes a first power source and the forced draft fan includes a second power source.

* * * * *